(12) United States Patent
Hambarde

(10) Patent No.: US 12,173,782 B2
(45) Date of Patent: Dec. 24, 2024

(54) GEAR BOX WITH MULTILAYER SEALING ARRANGEMENT

(71) Applicant: DANA ITALIA S.R.L., Trentino (IT)

(72) Inventor: Rajesh Hambarde, Pune (IN)

(73) Assignee: DANA ITALIA S.R.L, Arco (IT)

(*) Notice: Subject to any disclaimer, the term of this patent is extended or adjusted under 35 U.S.C. 154(b) by 95 days.

(21) Appl. No.: 18/068,446

(22) Filed: Dec. 19, 2022

(65) Prior Publication Data

US 2024/0200646 A1 Jun. 20, 2024

(51) Int. Cl.
*F16H 57/02* (2012.01)
*F16H 57/029* (2012.01)
*F16H 57/04* (2010.01)
*F16J 15/44* (2006.01)
*F16J 15/447* (2006.01)

(52) U.S. Cl.
CPC ....... *F16H 57/029* (2013.01); *F16H 57/0464* (2013.01); *F16J 15/447* (2013.01)

(58) Field of Classification Search
CPC . F16H 57/029; F16H 57/0464; B60K 17/043; F16J 15/447
See application file for complete search history.

(56) References Cited

U.S. PATENT DOCUMENTS

| | | | |
|---|---|---|---|
| 4,817,846 A * | 4/1989 | Eichinger | F16H 57/04 277/377 |
| 7,121,365 B2 | 10/2006 | Denton et al. | |
| 10,837,558 B2 * | 11/2020 | Klein-Hitpass | H02K 5/10 |
| 2008/0105543 A1 | 5/2008 | Dellaert et al. | |
| 2016/0031261 A1 * | 2/2016 | Ciulla | B60B 27/0073 384/484 |

FOREIGN PATENT DOCUMENTS

| | | | | |
|---|---|---|---|---|
| CN | 104110480 A | * | 10/2014 | ......... F16H 57/029 |
| CN | 205930973 U | * | 2/2017 | |
| CN | 206209908 U | | 5/2017 | |
| CN | 107524787 A | | 12/2017 | |
| CN | 110513465 A | * | 11/2019 | ......... F16H 57/029 |
| CN | 210949800 U | | 7/2020 | |
| CN | 213270967 U | | 5/2021 | |
| CN | 216951654 U | | 7/2022 | |
| DE | 102012216125 A1 | * | 3/2013 | ......... B60B 27/0005 |
| DE | 102020203820 A1 | * | 9/2021 | ......... B60K 17/043 |
| DE | 202023107472 U1 | * | 4/2024 | |

OTHER PUBLICATIONS

Machine translation of CN 110513465 A obtained on May 21, 2024.*

* cited by examiner

*Primary Examiner* — Adam D Rogers

(74) *Attorney, Agent, or Firm* — McCoy Russell LLP

(57) ABSTRACT

A gear box, including a gear box for a vehicle system is provided, and methods for assembling the gear box are provided. The gear box includes a stationary housing and one or more rotating members, a multilayer sealing arrangement formed between and sealing a fluid path between the one or more rotating members and the stationary housing, the multilayer sealing arrangement including a labyrinth seal, a first cassette seal, and a mechanical face seal, wherein the one or more rotating members includes a rotating hub, and the labyrinth seal is formed between the rotating hub and the stationary housing, whereby the rotating hub overlaps with the stationary housing.

17 Claims, 7 Drawing Sheets

GEAR BOX WITH MULTILAYER SEALING ARRANGEMENT

TECHNICAL FIELD

The present description relates to drive gear boxes in vehicle systems, and more particularly to a drive gear box including a multilayer sealing arrangement.

BACKGROUND AND SUMMARY

Drive gear boxes for propelling rice harvesters, tractors, construction vehicles, and similar vehicle drive systems are regularly subject to severe duty applications, such as being submerged in mud and water when driven in muddy fields, river beds, and canals. When the gear boxes are submerged in a mud slurry, the gear box is subject to abrasion from abrasive sand particles and stones that can readily wear and damage exposed surfaces of the gear box seal. Typically, the mud clinging to the surfaces of the gear box dries and hardens while the vehicle drive systems are parked overnight, which exacerbates the wear and abrasion of the gear box when the vehicle is restarted. The degradation of the gear box due to the exposure to the wet and dry mud drastically reduces the life of the gear box seal, resulting in seal failure, ingress of mud inside the gear box, and subsequent damage and failure of the gear box. Early failure and reduced life of the gear box increases frequency of repair and replacement of gear box components.

The drive gear boxes are typically sealed with a single mechanical face seal positioned at an external surface of the gear box, where ingress of mud (e.g., slurry of liquid and solid particles) into the gear box housing is to be mitigated. In particular, the mechanical face seal includes a dynamic sealing surface for sealing between the stationary and the rotating gear box elements of the track or wheel drive gear box. However, the inventors herein have recognized potential issues with such systems. Positioning the mechanical face seal at the external surface of the gear box demands for a large mechanical face seal, because the size of the mechanical face seal needs to match the size of, and seal between the surfaces of the stationary and rotating drive gear box elements thereat. Furthermore, friction between the mechanical face seal elements and the surfaces of the rotating gear box elements limits the maximum rotational speed of the gear box elements (and hence the maximum rotation speed of the track or wheel drive) in order to reduce wear and degradation of the mechanical face seal. Moreover, because the friction-induced wear and degradation of the mechanical face seal is proportional to the relative tangential speed between the stationary and rotating elements of the drive gear box, the maximum rotational speed of the gear box elements is more severely limited by the large size of the mechanical face seal.

To overcome at least some of the aforementioned drawbacks, a gear box is provided including a stationary housing, one or more rotating members, and a multilayer sealing arrangement formed between and sealing a fluid path between the one or more rotating members and the stationary housing. In one example, the multilayer sealing arrangement includes a labyrinth seal, a first cassette seal, and a mechanical face seal. Furthermore, the one or more rotating members includes a rotating hub. Further still, the labyrinth seal is formed between the rotating hub and the stationary housing, whereby the rotating hub overlaps with the stationary housing.

In one example, the labyrinth seal is positioned between an external surface of the gear box and the first cassette seal. In another example, the first cassette seal is positioned internally within the gear box between the mechanical face seal and the labyrinth seal in the multilayer sealing arrangement. In another example, the one or more rotating members includes a driveshaft, wherein the mechanical face seal is positioned internally within the gear box between the driveshaft and the first cassette seal.

The multilayer sealing arrangement substantially reduces ingress of foreign materials such as fluids and solids into the gear box, thereby prolonging the life of the gear box and increasing operational duration of the vehicle system before the gear box needs to be repaired or serviced. Furthermore, by positioning the mechanical face seal internally within the gear box, a size of the mechanical face seal can be reduced relative to the sealing arrangement for a conventional drive gear box that consists of a single mechanical face seal is positioned at an external surface of the gear box. As such, a maximum rotational speed of the gear box drive can be increased while mitigating wear and degradation due to friction at the mechanical face seal. Further still, the multilayer sealing arrangement, provides inherent redundancy to sealing of the drive gear box, and can increase adaptability of the drive gear box to various operational environments. In particular, when the gear box is subject to less severe operational environments, one or more of the mechanical face seal and a cassette seal may be removed without altering the configuration of the remaining gear box elements. Removing one or more of the mechanical face seal and a cassette seal can advantageously reduce a drag force on rotational elements of the gear box, thereby increasing an efficiency and useful life of the gear box.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 7:
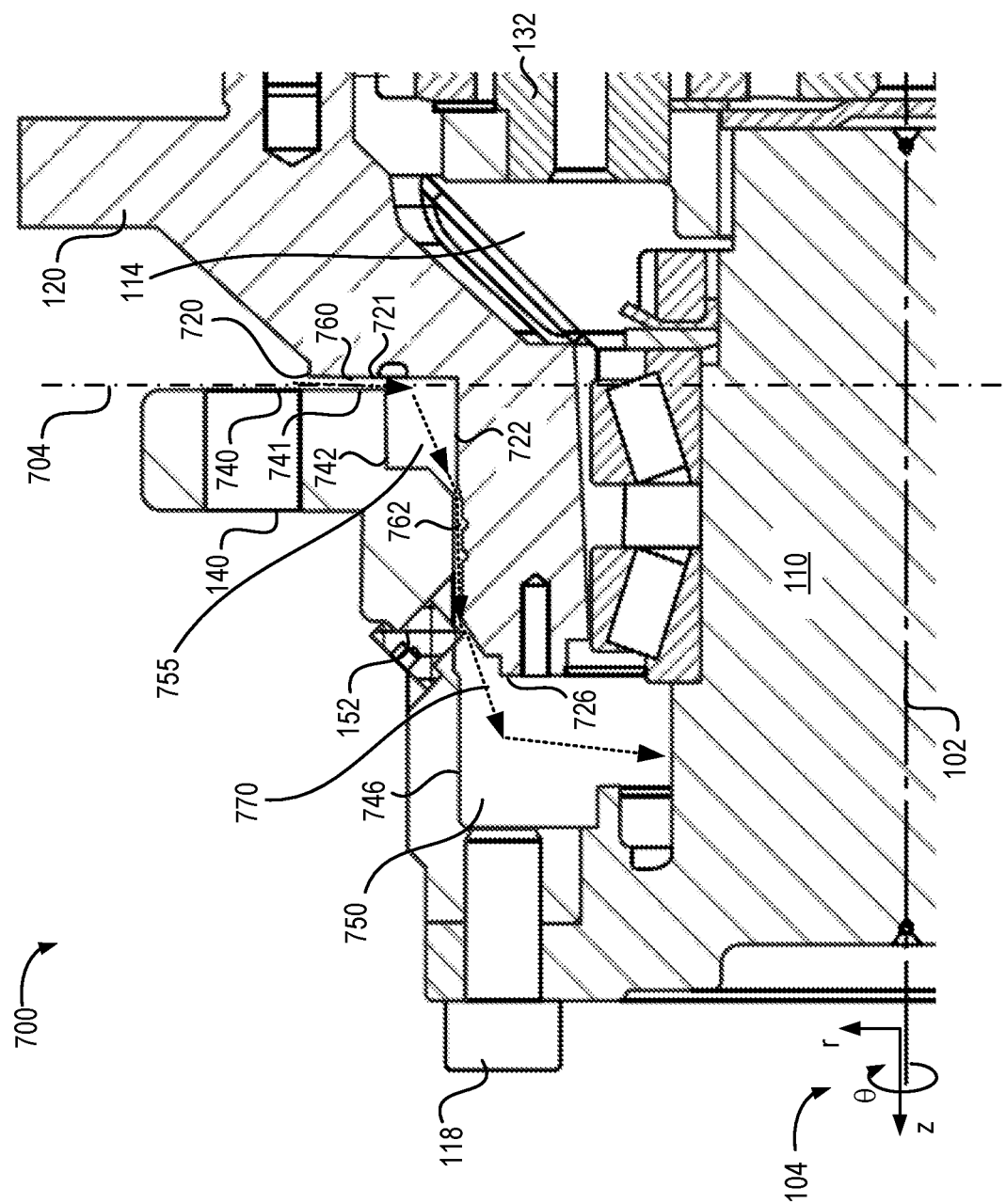
FIG. 7 shows a partial longitudinal cross-sectional view of the drive gear box of FIG. 1 shows a partial cross-sectional view of the drive gear box of FIG. 1, without the multilayer sealing arrangement.
Figure 8:
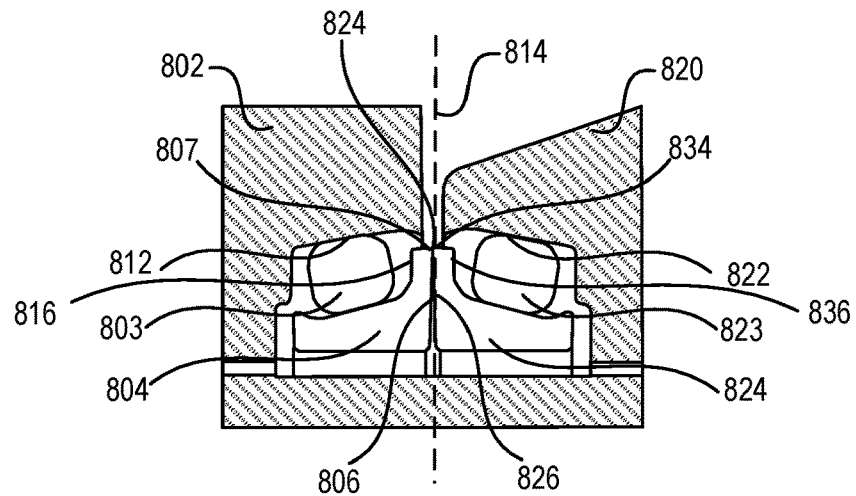
FIGS. 8 and 9 show examples of a conventional mechanical face seal and a conventional cassette seal.
Figure 9:
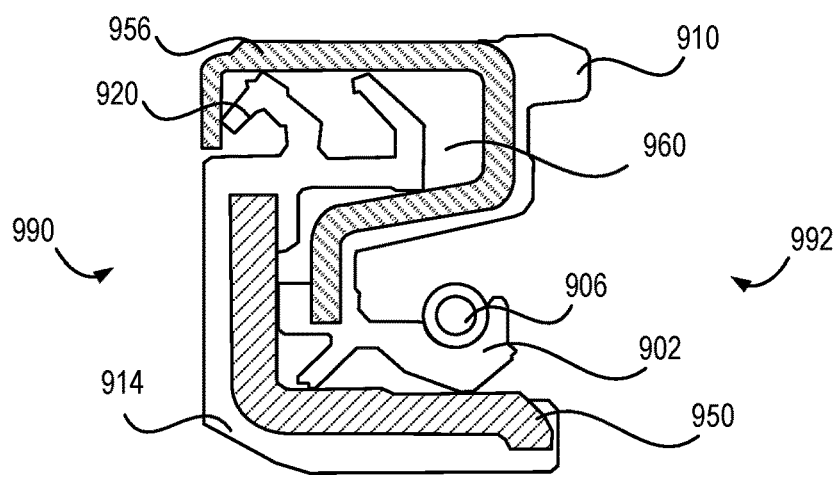
Figure 10:
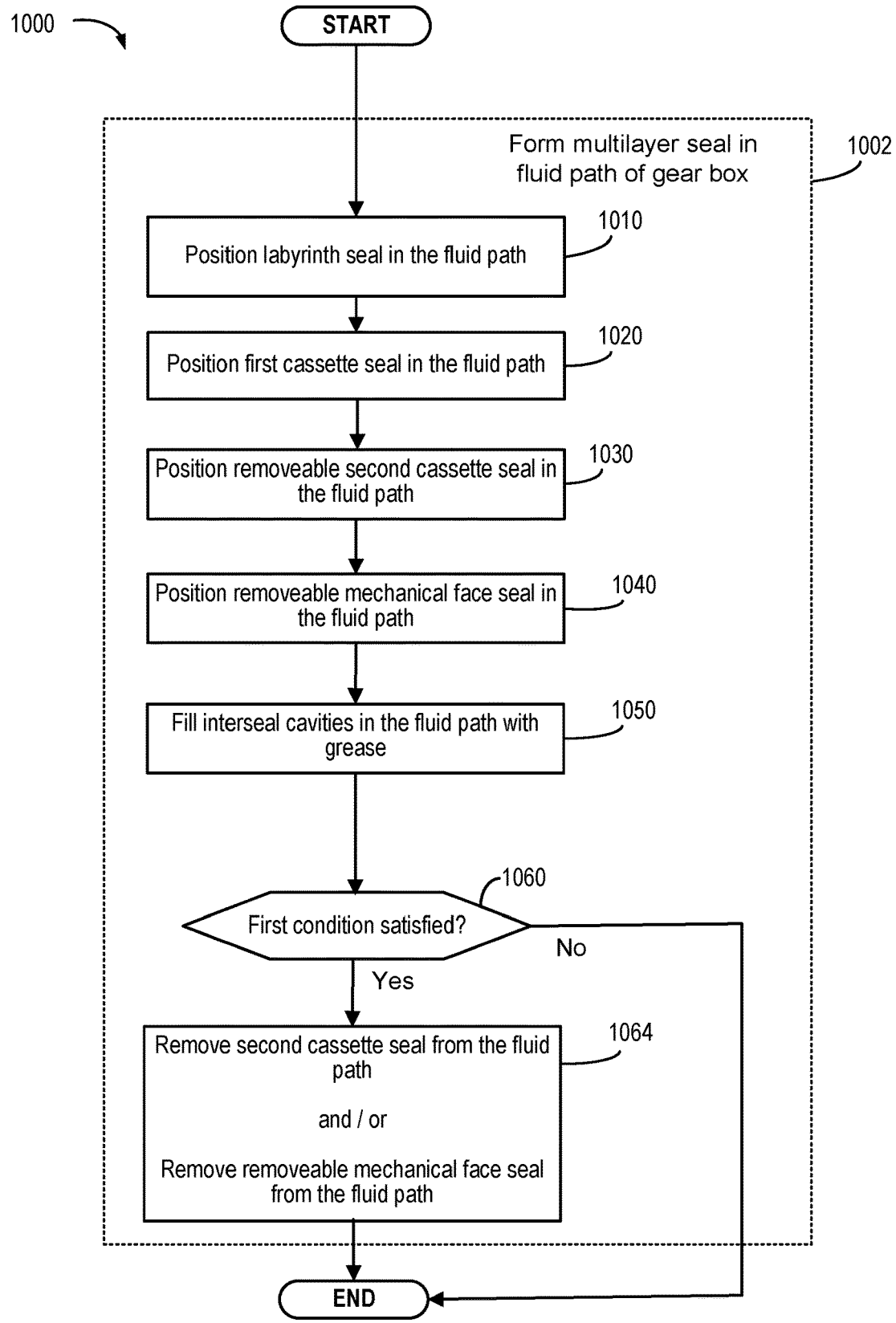
FIG. 10 shows a flow chart for an example method of assembling the gear box of FIG. 1, including the multilayer sealing arrangement.

A gear box for a drive system of a vehicle including various embodiments of a multilayer sealing arrangement is described herein and depicted schematically in FIGS. 1-4. The multilayer sealing arrangement includes a labyrinth seal; two embodiments of the labyrinth seal are depicted schematically in FIGS. 5-6. The gear box of FIG. 1 without the multilayer sealing arrangement is shown in FIG. 7. Examples of a mechanical face seal and a cassette seal are illustrated in FIGS. 8 and 9. FIG. 10 illustrates an example method of assembling the gear box with the multilayer sealing arrangement.

It is to be understood that the specific assemblies and systems illustrated in the attached drawings, and described in the following written specification are exemplary embodiments of the inventive concepts defined herein. For purposes of discussion, the drawings are described collectively. Thus, like elements may be commonly referred to herein with like reference numerals and may not be re-introduced.

FIGS. 1-7 show schematics of example configurations with approximate positioning of the various components, and are shown approximately to scale. However, it is to be appreciated that FIGS. 1-7 may be used to represent other relative dimensions. As used herein, the terms "approximately" is construed to mean plus or minus five percent of the range unless otherwise specified.

Figure 1:
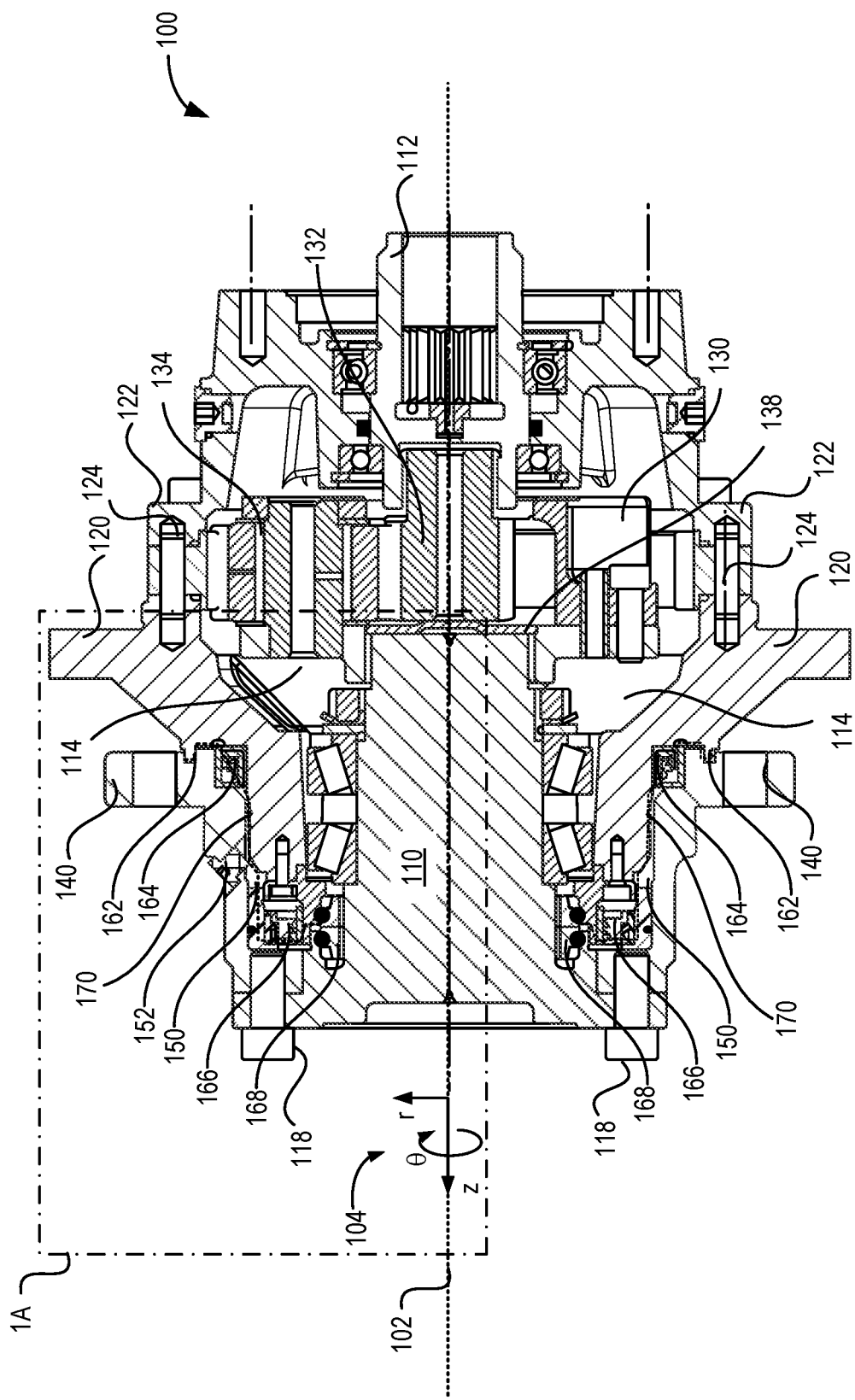
FIG. 1 shows a longitudinal cross-sectional view of a drive gear box including a first embodiment of a multilayer sealing arrangement.

Turning to FIG. 1, it illustrates a longitudinal cross-section of a gear box 100, including a multilayer sealing arrangement. Gear box 100 is shown to be centered about a longitudinal axis 102. FIG. 1 also depicts a set of cylindrical coordinate axes 104, including a z-coordinate axis that is collinear with the longitudinal axis 102, a radial coordinate, r, and an angular coordinate θ. Radial coordinate r increases and extends outwards (e.g., externally) from the z-coordinate axis (where r=0) for all angular coordinates, θ. Generally, the gear box 100 exhibits rotational or angular symmetry, about the z-coordinate axis, except where noted herein. When describing position of gear box elements, the terms more inwards or more internal are used to refer to a position that is closer in proximity to the longitudinal axis 102 (e.g., smaller r-coordinate value), whereas the terms more outwards or more external are used to refer to a position that is more distal or away from the longitudinal axis 102 (e.g., larger r-coordinate value). Furthermore, a higher z-coordinate position refers to a position closer to the output driveshaft 110 of the gear box relative to a lower z-coordinate position that refers to a position closer the input driveshaft 112.

Figure 3:
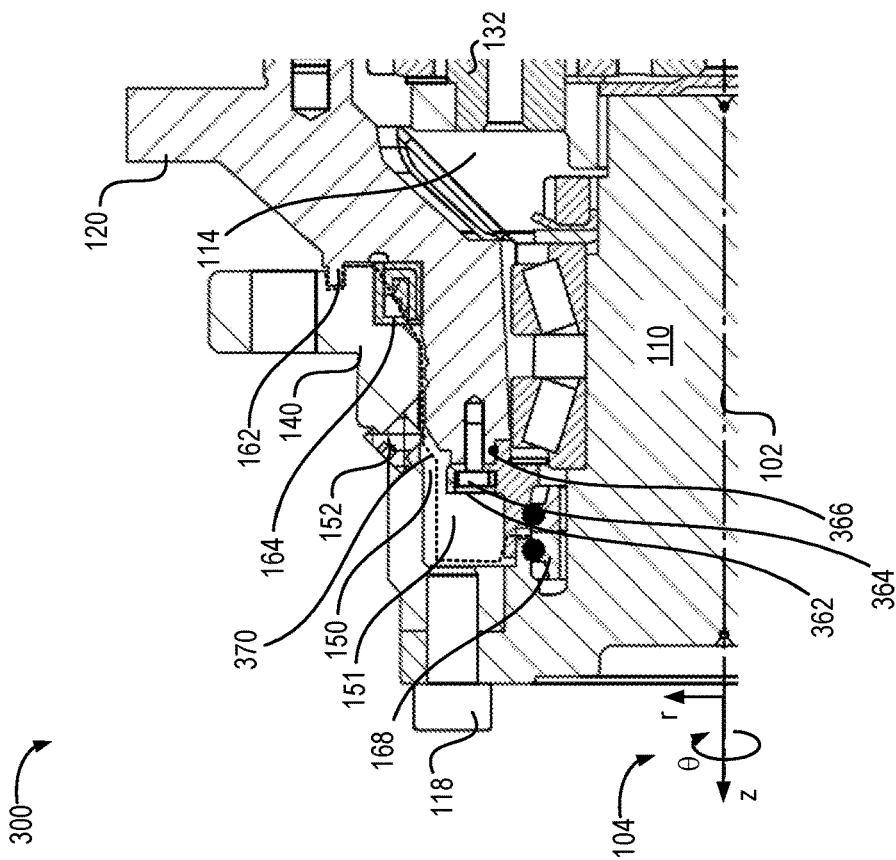
FIG. 3 shows a partial longitudinal cross-sectional view of the drive gear box of FIG. 1, including a second embodiment of a multilayer sealing arrangement.
Figure 2:
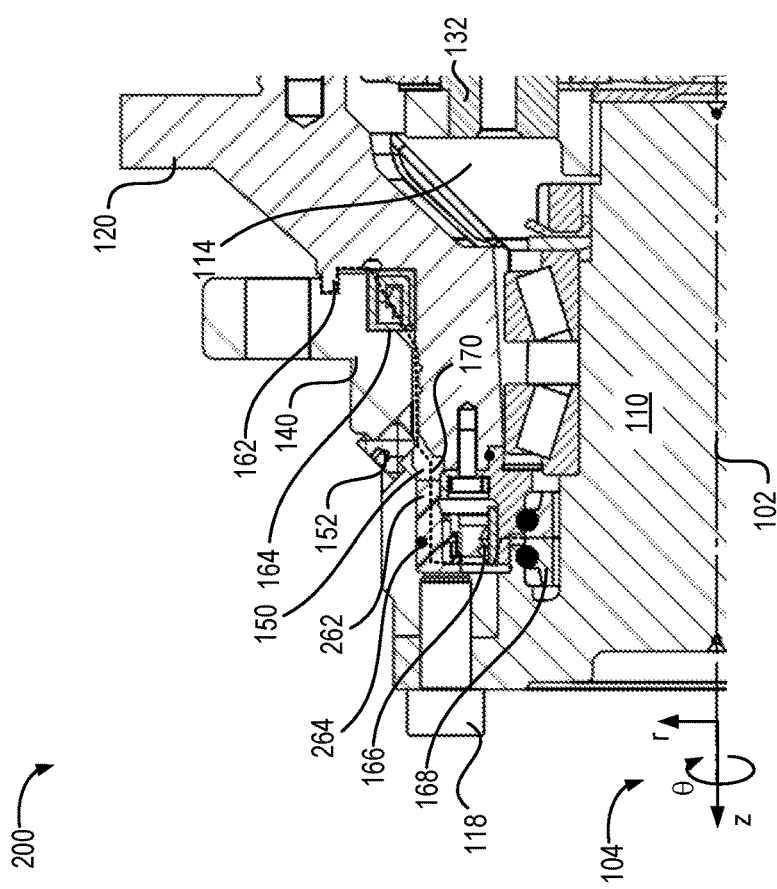
FIG. 2 shows a partial longitudinal cross-sectional view of the drive gear box of FIG. 1, including a first embodiment of a multilayer sealing arrangement.
Figure 4:
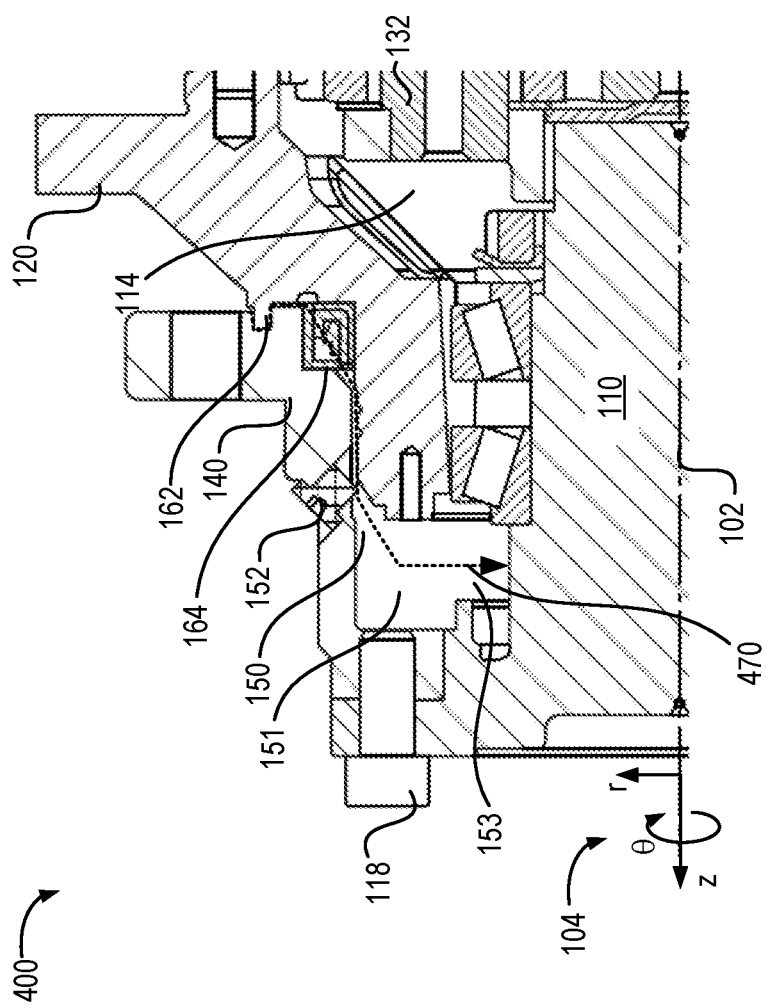
FIG. 4 shows a partial longitudinal cross-sectional view of the drive gear box of FIG. 1, including a third embodiment of a multilayer sealing arrangement.

Various embodiments of the multilayer sealing arrangement 200, 300, and 400 are depicted in FIGS. 2, 3, and 4, respectively, and are further described herein. The gear box 100 may include a gear box mechanically coupled to a sprocket or other device for rotating and driving tracks, wheels, or another propagation means for a vehicle system. In other words, the gear box may serve as a final drive for generating traction to propel the vehicle system. The vehicle system may include, but is not limited to, vehicles types such as agricultural machinery (e.g., a rice harvester, tractor, and the like), construction vehicles (bull dozer, back hoe, and the like), and the like. In particular, the vehicle system, including the gear box with the multilayer sealing arrangement described herein, may be advantageous over other vehicle systems because the multilayer sealing arrangement provides for increased sealing protection of the gear box 100 from ingress of fluids and solids during operation of the vehicle system, especially when subject to severe duty environments, including wet and abrasive environments, such as when submerged in mud.

Gear box 100 may include an input driveshaft 112 centered about the longitudinal axis 102 and mechanically coupled to and driven by a drive motor (not shown). The input driveshaft 112 may drive an output driveshaft 110 (also centered about longitudinal axis 102) by way of a series of planetary reduction gearing. Planetary reduction gearing (also referred to as epicyclic gearing) is enclosed in a planetary gear housing 130, and may include a center sun gear 132 and a plurality of driven planet gears 134, which rotate around the sun gear, a ring gear, and a carrier 138. The input driveshaft 112 may engage with and drive the rotation of the sun gear 132, which directly engages and drives rotation of the planet gears 134. The planet gears 134, in turn, directly engage with an internal surface gearing of a larger ring gear, and orbit the sun gear 132 in a path rotationally symmetrical about longitudinal axis 102. In this way, the planet gears 134 may be positioned between the ring and the sun gears, while engaged with both the ring and sun gears, and while rotating around the sun gear 132 and rotating inside the ring gear. The plurality of planet gears 134 are evenly distributed around the sun gear 132, and the center sun gear 132 and ring gear rotate symmetrically about the longitudinal axis 102. In one non-limiting example, the number of planet gears 134 may be at least 3; in another non-limiting example, the number of planet gears may be 4. The plurality of planet gears 134 are also coupled at their respective rotational axes to the carrier 138 so that the carrier 138 rotates synchronously with the rotation of the planet gears 134 rotate around the sun gear 132.

The gear box 100 may further include cavity 114 in fluid contact with the planetary reduction gearing and output driveshaft 110 that are at least partially filled with lubricant such as oil with additives for maintaining lubrication of the bearings and gears of the gear box 100. The oil is filled halfway until the centerline (longitudinal axis 102) of the gear box, filling cavity 114 may include a synthetic oil suitable for high-load applications, which may aid in providing lubrication to reduce friction and wear between metal-metal contacting elements of the gear box. The oil may advantageously reduce gear wear, increase efficiency of the gear-driven elements of the gear box, extend operational life, reduce operating temperatures, and reduce operational noise of the gear box 100.

Utilization of the planetary reduction gearing may be advantageous as compared with non-planetary gearing because a larger amount of torque can be generated since the load is shared among the plurality of planet gears. The planetary reduction gearing also allows for more contact surfaces and a larger contact area between the gears than a traditional parallel axis gear system; as such, the load may be more evenly distributed and may aid in making the gears inherently more resistant to wear and damage.

The planetary reduction gearing may engage and drive the output driveshaft 110 by way of the carrier 138. In one example, the carrier 138 may be coupled directly to and have face-sharing contact with an axial end of the output driveshaft 110, as shown in gear box 100, such that rotation of the planetary reduction gearing, including the carrier 138, drives rotation of the output driveshaft 110. Rotation of the output driveshaft 110 may drive the traction means (e.g., wheels, tracks, and the like) for generating traction for propelling the vehicle system. The output driveshaft 110 may be housed in an output cover 140 (also referred to herein as a rotating hub) that is attached to the output driveshaft 110 by a plurality of fasteners 118. As such, the output cover 140 rotates synchronously with the output driveshaft 110 when driven by the planetary reduction gearing and the input driveshaft 112. The output driveshaft 110 may also be housed within a stationary housing 120. Stationary housing 120 may be fixed to the frame, chassis, or other non-rotating element of the vehicle system. Stationary housing 120 may be fabricated from ductile iron, SG iron 500/7 grade, and the like, while the output cover may be fabricated from alloy steel SAE8620, carbon steel C40 grade, or carbon steel C45 grade, and the like.

In the gear box 100, the stationary housing 120 is positioned more toward the input drive side (lower z-coordinate) of the gear box 100, and at a more interior position relative to the output cover 140. As shown in FIG. 1, the stationary housing 120 and the output cover 140 may form concentric sleeves around the output driveshaft 110. Stationary housing 120 may be coupled to a second stationary housing 122 by way of fasteners 124. The second stationary housing 122 houses the planetary reduction gearing and input driveshaft 112 towards the input drive side (lower z-coordinate) of the gear box 100.

The multilayer sealing arrangement may include a plurality of seals positioned along and sealing a fluid path 170 between the rotating output cover 140, the rotating output driveshaft 110, and the stationary housing 120. In this way, the multilayer sealing arrangement is positioned between one or more rotating members and the stationary housing of the gear box 100. It is to be noted again that the multilayer sealing arrangement may be rotationally (e.g., angularly) symmetrical about the longitudinal axis 102. As such, each of the plurality of seals making up the multilayer sealing arrangement may include annular seals. The fluid path 170 is indicated by a dotted line, and includes the any cavities between the rotating output cover 140 and the stationary housing 120 that are external to the mechanical face seal 168. In particular, the fluid path 170 includes the series of annular cavities external to the mechanical face seal 168 that would be fluidly connected in series between the output driveshaft 110 and the atmosphere, in the absence of the plurality of seals making up the multilayer sealing arrangement. As described further with reference to FIGS. 3, 4, and 7, the annular cavities may include one or more of cavities 150, 151, 153, and 155.

In a first embodiment (as shown in FIG. 1, and schematic 200 of FIG. 2), the plurality of seals in the multilayer sealing arrangement may include a labyrinth seal 162, a first cassette seal 164, a second cassette seal 166, and a mechanical face seal 168. In a second embodiment (schematic 300 of FIG. 3), the plurality of seals in the multilayer sealing arrangement may include a labyrinth seal 162, a first cassette seal 164, and a mechanical face seal 168. In a third embodiment (schematic 400 of FIG. 4), the plurality of seals in the multilayer sealing arrangement may include a labyrinth seal 162 and a first cassette seal 164. In each of the first, second, and third embodiments, the multilayer sealing arrangement may further include grease, partially filling or filling any cavities and spaces in the fluid path 170 external to the mechanical face seal 168, and between each of the seals of the multilayer sealing arrangement. The cavities that may be partially filled or entirely filled with grease include annular cavity 150; furthermore, in the second and third embodiments of the multilayer sealing arrangement where one or more of the second cassette seal and the mechanical face seal are absent, the multilayer sealing arrangement may include grease partially filling or filling the annular cavities 151 and 153 vacated by those absent seals, as described further with respect to FIGS. 3 and 4. In one example, the grease may include a low viscosity, adhesive grease. Output cover 140 may include one or more grease plugs 152 for injecting grease into the annular cavities of the fluid path 170. In one example, the grease plugs 152 include two 90-degree grease plugs, to facilitate greasing of the gear box 100 in the field. The presence of grease in the cavities or spaces along the fluid path 170 may aid in further mitigating ingress of fluids and solid particles into the gear box 100, especially in the case where one or more of the first and second cassette seals 164 and 166 have failed. For a layout shown in FIG. 4, the cavities 150, 151 cannot be filled with grease as these cavities will get filled by lubricating oil of gear box. In this layout lubricating oil of gear box will reach and stop at Cassette seal-164.

The space between the interior-facing surface of the mechanical face seal 168 and the exterior-facing surface of the output driveshaft 110 may be partially filled or entirely filled with lubricating oil to cool and lubricate the mechanical face seal 168.

Each of the plurality of seals of the multilayer sealing arrangement allow for free rotation of the rotating output cover 140 and the output driveshaft 110 relative to the stationary housing. In particular, the output cover 140 and the output driveshaft 110 rotate freely, except for friction arising between fluid path-facing surfaces of the stationary housing 120, output cover 140, output driveshaft 110, the plurality of seals of the multilayer sealing arrangement and the grease filling cavities of the fluid path 170.

As such in the first embodiment, the sealing layers of the multilayer sealing arrangement include, from the innermost position to the outermost position, the mechanical face seal 168, the second cassette seal 166, the first cassette seal 164, and the labyrinth seal 162. In other words, the mechanical face seal 168 is positioned most internally in the gear box 100, relative to the other seals of the multilayer sealing arrangement. In particular, the mechanical face seal 168 is positioned adjacent to a rotational circumference the output driveshaft 110. As such, the size of the mechanical face seal 168 in the multilayer sealing arrangement may be reduced, relative to a case where a mechanical face seal is positioned at an external surface of a gear box. In particular, a diameter of the annular mechanical face seal 168 may be smaller than a diameter of the second cassette seal 166, which in turn may be smaller than a diameter of the first cassette seal 164, which in turn may be smaller than a diameter of the labyrinth seal 162. Furthermore, the labyrinth seal is positioned most externally in the gear box 100, relative to the other seals of the multilayer sealing arrangement. In particular, the labyrinth seal 162 may be positioned so that a portion of the labyrinth seal 162 is positioned directly adjacent to an external surface of the gear box 100. In this way, the labyrinth seal 162 includes an external surface (refer to FIGS. 5 and 6) that is exposed to the atmosphere outside of the gear box 100, and any ingress of fluid and/or solid particles into the multilayer sealing arrangement first makes contact with the labyrinth seal 162 prior to contacting other seals of the multilayer sealing arrangement. More specifically, any ingress of fluid and/or solid particles into the multilayer sealing arrangement follows the fluid path 170 and first passes through the labyrinth seal 162, then the first cassette seal 164, then the second cassette seal 166, then the mechanical face seal 168, before reaching the output driveshaft 110. Furthermore, any ingress of fluid and/or solid particles into the multilayer sealing arrangement must also breach the grease-filled cavities and volumes between each of the seals along the fluid path 170 in order to reach output driveshaft 110.

An axial position of each sealing layer of the multilayer sealing arrangement may also be offset along the longitudinal axis 102 (e.g., in the z-coordinate direction) of the gear box 100. The mechanical face seal 168 may be positioned more towards the output side (e.g., towards the output driveshaft 110) of the gear box 100; followed by the second cassette seal 166, which may be positioned less towards the output side of the gear box 100 than the mechanical face seal 168; followed by the first cassette seal 164, which may be positioned less towards the output side of the gear box 100 than the second cassette seal 166; and finally, the labyrinth seal 162, which may be positioned less towards the output side of the gear box 100 than first cassette seal 164. In other words, the labyrinth seal 162 is positioned most towards the input side of the gear box (e.g., towards the input driveshaft 112), followed by the first cassette seal 164, the second cassette seal 166, and the mechanical face seal 168, respectively. Offsetting each of the sealing layers of the multilayer sealing arrangement in an axial direction aids in elongating the fluid path 170 through the multilayer sealing arrangement, which aids in mitigating intrusion of fluids and solid particles into the gear box 100 past the multilayer sealing arrangement. Furthermore offsetting each of the sealing layers of the multilayer sealing arrangement in an axial direction allows for a more compact gear box 100, especially in a radial dimension, because each of the sealing layers are not stacked in a radial direction.

Turning now to FIG. 2, it illustrates a schematic 200 of a partial longitudinal cross-section (as indicated by dashed box 1A) of the gear box 100 of FIG. 1, including the first embodiment of the multilayer sealing arrangement. As described with reference to FIG. 1, the first embodiment of the multilayer sealing arrangement includes a labyrinth seal 162 positioned at and sealing an external surface of the gear box 100. In particular, the labyrinth seal 162 includes mutually interlocking elements of the rotating output cover 140 and the stationary housing 120, which together, elongate and increase a tortuosity of the fluid path 170 therebetween relative to the fluid path 770 when the multilayer sealing arrangement is absent from the gear box 100. (c.f., FIG. 7). The first embodiment of the multilayer sealing arrangement further includes a first cassette seal 164 positioned more internally and at a higher z-coordinate relative to the labyrinth seal 162, a second cassette seal 166 positioned more internally and at a higher z-coordinate relative to the first cassette seal 164, and a mechanical face seal 168 positioned more internally and at a higher z-coordinate relative to the second cassette seal 166. The gear box 100 further includes a cylindrical cover 262 and an O-ring 264. The cylindrical cover 262 aids in holding the position of the second cassette seal 166 in place and the O-ring 264 aids in firmly fixing the cylindrical cover 262 inside the output cover 140. As such, the cylindrical cover 262 and the O-ring 264 are separate elements from the second cassette seal 166, and are assembled separately along with the second cassette seal 166 when forming the multilayer sealing arrangement. The gear box 100 further includes a flange 362, fasteners 364, and O-ring 366. Flange (or cover plate) 362 is fastened to the stationary housing 120, and flange 362 aids in holding a position of the mechanical face seal 168. Flange 362 also functions as a housing for a portion of the mechanical face seal 168. Fasteners 364 may include M6 bolts, and aid in fastening the flange 362 to the stationary housing 120. As such, the flange 362 is stationary while the gear box 100 is operating. O-ring 366 aids in sealing between the flange 362 and stationary housing 120, thereby mitigating flowing material from penetrating therethrough. Accordingly, the first embodiment of the multilayer sealing arrangement further includes cylindrical cover 262, O-ring 264, flange 362, fasteners 264, and O-ring 366.

In this way, the first cassette seal 164 is positioned between the labyrinth seal 162 and the second cassette seal 166 along the fluid path 170, and the second cassette seal 166 is positioned between the first cassette seal 164 and the mechanical face seal 168 along the fluid path 170. Furthermore, in the first embodiment of the multilayer sealing arrangement, the mechanical face seal 168 is positioned most internally and at the lowest z-coordinate (most proximal to the input driveshaft 112) and the labyrinth seal 162 is positioned most externally and at the highest z-coordinate (most proximal to the output driveshaft 110). In one example, the gear box 100 including the first embodiment of the multilayer sealing arrangement may be utilized for vehicle systems operating in severe duty applications such as agricultural or construction machinery operating in muddy, sandy, stony, and/or wet terrain, especially where the gear box 100 may be partially or fully submerged in fluid or slurry.

Turning now to FIG. 3, it illustrates a schematic 300 of partial longitudinal cross-section (as indicated by dashed box 1A) of the gear box 100 of FIG. 1, including a second embodiment of the multilayer sealing arrangement. The second embodiment of the multilayer sealing arrangement includes a labyrinth seal 162 positioned at and sealing an external surface of the gear box 100. In particular, the labyrinth seal 162 includes mutually interlocking elements of the rotating output cover 140 and the stationary housing 120, which together, form an elongated and more tortuous fluid path 370 therebetween relative to the fluid path 770, which corresponds to when the multilayer sealing arrangement is absent from the gear box 100. (c.f., FIG. 7). The second embodiment of the multilayer sealing arrangement further includes a first cassette seal 164 positioned more internally and at a higher z-coordinate relative to the labyrinth seal 162, and a mechanical face seal 168 positioned more internally and at a higher z-coordinate relative to the first cassette seal 164. In this way, the first cassette seal 164 is positioned between the labyrinth seal 162 and the mechanical face seal 168 along the fluid path 370. Furthermore, in the second embodiment of the multilayer sealing arrangement, the mechanical face seal 168 is positioned most internally and at the lowest z-coordinate (most proximal to the input driveshaft 112) and the labyrinth seal 162 is positioned most externally and at the highest z-coordinate (most proximal to the output driveshaft 110). In this way, the fluid path 370 may also correspond to the fluid path 170 when the second cassette seal 166 is absent from the multilayer sealing arrangement.

In one example, the second cassette seal 166 may be a removable seal. In other words, the second embodiment of the multilayer sealing arrangement may be achieved by removing the second cassette seal 166 along with O-ring 264 and cylindrical cover 262 from the first embodiment of the multilayer sealing arrangement. In particular, the second cassette seal 166, O-ring 264, and cylindrical cover 262 may be removed from the gear box 100, without modifying other elements of the gear box, including without modifying the output cover 140, the output driveshaft 110, the housing 120, and any mating part. The term mating part may refer to the elements of the gear box 100 directly adjacent to the second cassette seal 166 (excluding the O-ring 264 and the cylindrical cover 262). In another example, the second embodiment of the multilayer sealing arrangement may be configured by assembling the gear box 100, including positioning the labyrinth seal 162, first cassette seal 164, and mechanical face seal 168, without including the second cassette seal 166, O-ring 264, and cylindrical cover 262. Additionally, grease may be added to any cavities and spaces along the fluid path 370 external to the mechanical face seal 168, such as cavities 151 and 150. Cylindrical cover 262 aids in holding the second cassette seal 166 in place and O-ring 264 aids in firmly fixing or holding the cylindrical cover 262 inside the output cover 140.

Turning now to FIG. 4, it illustrates a schematic 400 of partial longitudinal cross-section (as indicated by dashed box 1A) of the gear box 100 of FIG. 1, including a third embodiment of the multilayer sealing arrangement. The third embodiment of the multilayer sealing arrangement includes a labyrinth seal 162 positioned at and sealing an external surface of the gear box 100. In particular, the labyrinth seal 162 includes mutually interlocking elements of the rotating output cover 140 and the stationary housing 120, which together, form an elongated and more tortuous fluid path 470 therebetween relative to the fluid path 770, corresponding to when the multilayer sealing arrangement is absent from the gear box 100. (c.f., FIG. 7). The third embodiment of the multilayer sealing arrangement further includes a first cassette seal 164 positioned more internally and at a higher z-coordinate relative to the labyrinth seal 162. In this way, the first cassette seal 164 is positioned between the labyrinth seal 162 and the output driveshaft 110 along the fluid path 470. Furthermore, in the third embodiment of the multilayer sealing arrangement, the first cassette seal 164 is positioned most internally and at the lowest z-coordinate (most proximal to the input driveshaft 112) and the labyrinth seal 162 is positioned most externally and at the highest z-coordinate (most proximal to the output driveshaft 110). In this way, the fluid path 470 may also correspond to the fluid path 170 when the second cassette seal 166 and the mechanical face seal 168 are absent from the multilayer sealing arrangement. Comparing the embodiments 200, 300, and 400, of the multilayer sealing arrangement shows that the elongation (relative to fluid path 770) and tortuosity of the fluid path 170 is greater than the elongation and tortuosity of fluid path 370; and the elongation (relative to fluid path 770) and tortuosity of the fluid path 370 is greater than the elongation and tortuosity of fluid path 470.

In one example, the mechanical face seal 168 may be a removable seal. In other words, the third embodiment of the multilayer sealing arrangement may be achieved by removing the mechanical face seal 168 along with flange 362, fasteners 364, and O-ring 366 from the second embodiment of the multilayer sealing arrangement. In particular, the mechanical face seal 168 and elements 362, 364, and 366 may be removed from the gear box 100 without modifying other elements of the gear box, including without modifying the output cover 140, the output driveshaft 110, the stationary housing 120, and any mating part. The term mating part may refer to the elements of the gear box 100 directly adjacent to the mechanical face seal 168 (excluding flange 362, fasteners 364, and O-ring 366). In the third embodiment of the multilayer sealing arrangement, grease is also removed from the cavities and spaces of the fluid path 470 because in the absence of the mechanical face seal 168, oil will flow through the fluid path 470 between the output driveshaft 110 and the first cassette seal 164. In another example, the third embodiment of the multilayer sealing arrangement may be configured by assembling the gear box 100, including positioning the labyrinth seal 162 and the first cassette seal 164, without including the second cassette seal 166, O-ring 264, cylindrical cover 262, mechanical face seal 168, and flange 362, fasteners 364, and O-ring 366.

In this way, the multilayer sealing arrangement may be easily and flexibly adapted between the first, second, and third embodiments to a particular operating application or environment. In one non-limiting example, the gear box 100 including the multilayer sealing arrangement may be adapted to a severe, moderate, or light duty operation environment by configuring the gear box 100 with the first, second, or third embodiment multilayer sealing arrangement, respectively. Said in another way, the multilayer sealing arrangement can be flexibly adapted by adding and/or removing seals (to achieve one of the first, second, or third embodiments of the multilayer sealing arrangement), depending on the gear box application, without modifying any mating part, including the stationary housing 120, the output cover 140, and the output driveshaft 110, and while maintaining a useful life of the gear box 100 by mitigating ingress of fluid and solid particles from the environment external to the gear box 100.

Turning now to FIG. 7, it depicts a schematic 700 of the partial longitudinal cross-section 1A of the gear box 100 without any of the seals of the multilayer sealing arrangement embodiments (e.g., without the labyrinth seal 162, first cassette seal 164, second cassette seal 166, and mechanical face seal 168). In the absence of the multilayer sealing arrangement, a fluid path 770 between the rotating output cover 140, the rotating output driveshaft 110, and the stationary housing 120 is clearly depicted by the series of dotted arrows. The fluid path 770 depicts the path that flowing materials (including gas, liquids, and slurry liquid/solid mixtures), after ingress into the gear box 100, may potentially follow. In particular, the fluid path 770 may correspond to the fluid path 170 in the absence of the multilayer sealing arrangement. Fluid path 770 begins at the external surface of the gear box 100 where the surfaces 740 and 720 of the output cover 140 and the stationary housing 120, respectively, converge but do not make face-sharing contact. In the example of FIG. 7, the surfaces 740 and 720 converge so that an interposing cross-sectional area or an interposing volume between them tapers and becomes smaller. In particular, the surfaces 740 and 720 converge and form a mouth of a first gap 760 therebetween (and between the output cover 140 and the stationary housing 120). First gap 760 extends from the external surface of the gear box 100 to an interior of the gear box 100 at the mouth of a first cavity 755. In the example of FIG. 7 first gap 760 is of uniform thickness along its length, however, in other examples, the first gap 760 may not be of uniform thickness along its length; for example, the walls of first gap 760 may be tapered or may diverge. The walls of first gap 760 are interior surfaces 741 and 721 of the output cover 140 and the stationary housing 120, respectively. Interior surfaces 741 and 721 connect to surfaces 740 and 720, respectively, and also to surfaces 742 and 722, respectively.

An axis 704 demarcates the midpoint between the walls of the first gap 760 and extends through the first gap 760 and transversely relative to the z-coordinate axis. In the example of FIG. 7, axis 704 and the first gap 760 are oriented perpendicular to the z-coordinate axis, but in other examples, axis 704 and the first gap 760 may be oriented transversely but not perpendicular to the z-coordinate axis. Orienting the first gap 760 (and axis 704) perpendicularly to the z-coordinate axis may aid in mitigating ingress of flowing materials into the gear box 100 by way of the fluid path 770 because flowing materials external to the gear box 100 may be less likely convected and/or entrained into the first gap 760 during motion of the vehicle system. As described with reference to FIGS. 1-6, incorporating mutually interlocking elements into the interior surfaces 741 and 721 to form a labyrinth seal 162 (as a component seal of the multilayer sealing arrangement) increases a tortuosity of and elongates the gap therebetween relative to the first gap 760, and aids in mitigating ingress of flowing materials into the gear box 100.

After passing the first gap 760, flowing materials may continue to flow interiorly through a first cavity 755 and a second gap 762. The first cavity 755 and second gap 762 are formed between interior surfaces of the rotating cover 140 and stationary housing 120. In particular, first cavity 755 is formed from interior surfaces 742 and 722 that diverge interiorly along fluid path 770 from first gap 760 to form the first cavity 755, and then converge interiorly along the fluid path 770 to form the second gap 762. Forming the first cavity 755 may facilitate placement of a first cassette seal 164 in the multilayer sealing arrangement. In the example of FIG. 7 second gap 762 is of uniform thickness along its length, however, in other examples, the second gap 762 may not be of uniform thickness along its length; for example, the walls of second gap 762 may be tapered or may diverge. In the example of FIG. 7, second gap 762 is oriented parallel to the z-coordinate axis and perpendicular to the axis 704, however in other examples, the second gap may be oriented differently. Orienting the second gap 762 perpendicular to the first gap 760 may aid in increasing a tortuosity of the fluid path 770, thereby mitigating ingress of flowing materials into the gear box 100 by way of the fluid path 770.

After passing the second gap, flowing materials may continue to flow interiorly through a second cavity 750. The second cavity 750 is formed between interior surfaces of the gear box 100, including the interior surfaces of the rotating cover 140, stationary housing 120, and output driveshaft 110. In particular, the second cavity 750 is formed from interior surfaces 746 and 726 that diverge interiorly along fluid path 770 from second gap 762. Forming the second cavity 750 may facilitate placement of a second cassette seal 166 and a mechanical face seal 168 more interiorly and more proximal to the output driveshaft 110 in the multilayer sealing arrangement relative to the seals positioned at gap 760 and first cavity 755. The second cavity 750 corresponds to the sum of cavities 150, 151, and 153, as referred to in FIGS. 1-6.

In this way, fluid path 770 includes first gap 760, first cavity 755, second gap 762 and second cavity 750. First gap 760 is positioned at an external surface of the gear box 100, and extends interiorly into the gear box 100. First cavity 755 is positioned interior to the first gap 760 and between the first gap 760 and the second gap 762 along the fluid path 770. The second gap 762 is positioned interior to the first cavity 755 and between the first cavity 755 and the second cavity 750 along the fluid path 770. The second cavity is positioned interior to the second gap 762 along the fluid path 770. As shown in FIG. 7, the second cavity 750 may be larger than the first cavity 755. Positioning the second cavity 750 interior to the second gap 762 and the first cavity 755 and sizing the second cavity 750 larger than the first cavity 755 may advantageously facilitate placement of additional seals more interiorly in the gear box 100, which can mitigate degradation of those seals from contact with flowing materials entering the gear box 100. Furthermore, by positioning seals more interiorly inside the gear box 100, a size (e.g. a seal diameter) of the seal may be decreased, which aids in mitigating penetration of flowing materials therethrough, and reduces seal repair (e.g., replacement or maintenance) frequency.

Comparison of FIGS. 1-6 with FIG. 7 shows that the fluid path 170 is more tortuous and elongated relative to the fluid path 770. The tortuosity refers to the ratio of the actual flow path length to the linear distance between ends of the flow path. Accordingly, the tortuosity of the fluid path 770 may refer to a ratio of the actual fluid path length (e.g., this distance traveled by fluid flowing along fluid path 770) divided by the linear distance between the mouth of the fluid path 770 and the output driveshaft 110 surface making up the interior wall of the second cavity 750. Analogously, the tortuosity of the fluid path 170 may refer to a ratio of the actual fluid path length (e.g., this distance traveled by fluid flowing along fluid path 170, including the distance traveled to penetrate the seals of the multilayer sealing arrangement) divided by the linear distance between the mouth of the fluid path 170 and the output driveshaft 110 surface adjacent to the mechanical face seal 168.

Thus, the gear box 100 including the multilayer sealing arrangement elongates and increases a tortuosity of the fluid path 170 relative to the fluid path 770 corresponding to the gear box 100 without the multilayer sealing arrangement because the multilayer sealing arrangement incorporates more bends and turns in the fluid path 170 and inserts obstructions (e.g., first and second cassette seals 164 and 166, and mechanical face seal 168) around which the flow material must travel in order to reach the end of the fluid path 170. Specifically, including a labyrinth seal, including one or more pairs of interlocking elements in the output cover 140 and stationary housing 120 at internal surfaces 542 and 522 thereof, respectively, elongates and increases a tortuosity of the gap therebetween (c.f., tortuous gap 560 relative to first gap 760). Furthermore, one or more of a first cassette seal 164 positioned at the first cavity 755, a second cassette seal 166 positioned at the second cavity 750, and a mechanical face seal 168 at the second cavity 750 obstructs the fluid path 170 to flowing material entering the gear box 100. Flowing material (e.g., fluids, solids, gas) in the fluid path 170 must breach the one or more seals of the multilayer sealing arrangement, as well as the grease filling the cavities (e.g., cavities 150 and second gap 762) in order to reach the output driveshaft 110.

Figure 5:
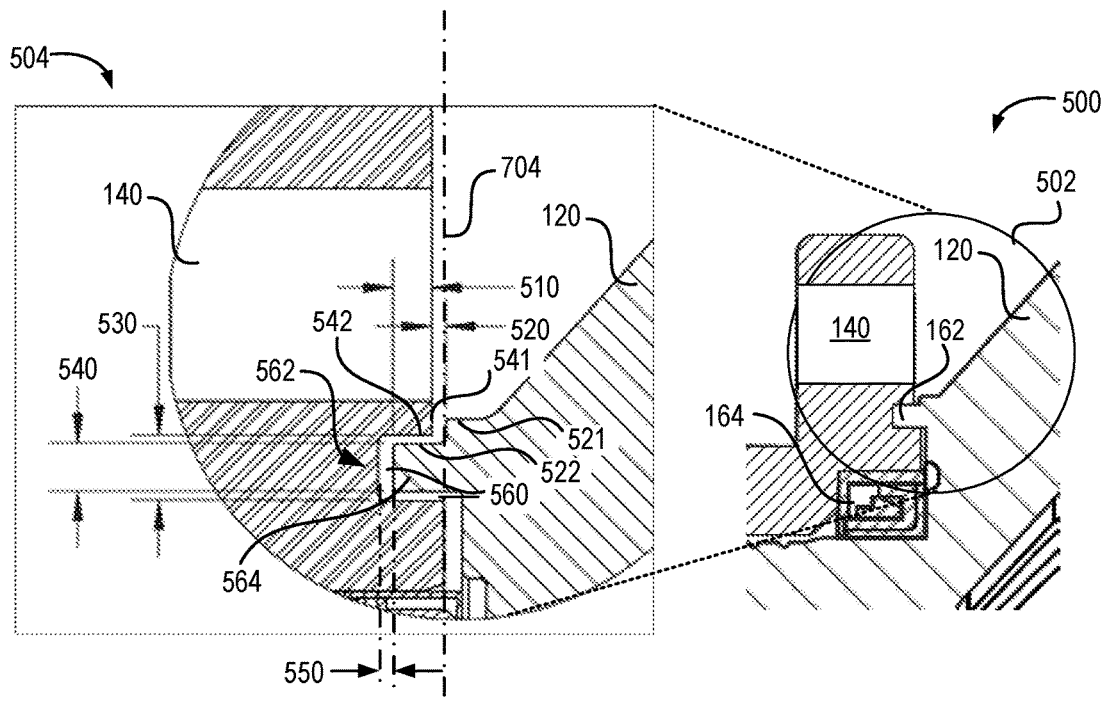
FIG. 5 shows a partial cross-sectional view of the drive gear box of FIG. 1, including a first embodiment of a labyrinth seal of the multilayer sealing arrangement.

Turning now to FIG. 5, it illustrates a schematic 500 of a partial cross-sectional view of the drive gear box of FIG. 1, including a first embodiment of a labyrinth seal 12 of the multilayer sealing arrangement, and a schematic 504 of an enlarged circular portion 502 of the cross-sectional view of schematic 500. As depicted in schematic 504, the first embodiment of the labyrinth seal 162 is positioned at a convergence of the external surfaces of the output cover 140 and the stationary housing 120 at axis 704. Furthermore, the first embodiment of the labyrinth seal includes stationary housing 120 with a protrusion 564 and output cover 140 with a recess 562. In particular, the protrusion 564 and the recess 562 form mutually interlocking elements of the respective stationary housing 120 and the output cover 140. Specifically, the protrusion 564 of stationary housing 120 extends across the axis 704 and into the recess 562. In this way, the protrusion 564 overlaps with the recess 562 across the axis 704, where the internal surfaces 542 and 522 of the output cover 140 and the stationary housing 120, respectively, approach but do not make face-sharing contact with each other, thereby increasing a tortuosity and elongating a first gap 760 to form a tortuous gap 560 therebetween. As such, the tortuous gap 560 formed between the internal surfaces 542 and 522 is more tortuous and elongated relative to first gap 760 and may cross the axis 704 in multiple and opposing directions. Accordingly, any flowing material penetrating in to the labyrinth seal 162 is directed along the tortuous gap 560, thereby crossing the axis 704 (also referred herein to as the interlocking axis) in multiple an opposing directions as it flows in an interior direction. In the example of FIG. 5, flowing material enters the gear box 100 at tortuous gap 560 and flows across the axis 704 in the positive z-direction before flowing across the axis 704 in the negative z-direction as it moves interiorly through the tortuous gap 560. As shown in FIG. 7, in the absence of the labyrinth seal 162, the surfaces 742 and 722 forming the first gap 760 do not cross over or extend across the axis 704.

In the example of FIG. 5, the cross-sectional shape of the protrusion 564 is of a square or rectangular shape, and the cross-sectional shape of the recess 562 includes a square or rectangular shape. The cross-sectional shape of recess 562 is slightly larger than the cross-sectional shape of the protrusion 564, which facilitates formation of the tortuous gap 560 between the perimeters of the protrusion 564 and the recess 562. In particular, owing to the protrusion 564 and recess 562, flowing material entering the gear box 100 at the tortuous gap 560 must flow and negotiate four 90-degree bends in the tortuous gap 560 in order to move interiorly past them. Furthermore, the four 90-degree bends in the tortuous gap 560 include two 90-degree bends to the right and two 90-degree bends to the left (right and left relative to moving along the tortuous gap 560 interiorly). In the example of FIG. 5, the labyrinth seal 162 includes at least one pair of mutually interlocking elements; in other words, in some examples, the labyrinth seal 162 may include one or more pairs of interlocking elements. When the labyrinth seal 162 includes additional pairs of mutually interlocking elements a tortuosity and path length of the fluid path 170 may be further increased, thereby further mitigating ingress of flow materials into the gear box 100; however, including additional pairs of mutually interlocking elements may also increase a manufacturing complexity and repair frequency of the gear box 100, and may reduce free rotation of the output cover 140 due to increased friction with the grease in the tortuous gap 560.

The square or rectangular cross-sectional shape of the protrusion 564 and the recess 562 may aid in increasing the tortuosity and path length of the tortuous gap 560 while maintaining capability of the output cover 140 about the stationary housing 120. Here, the tortuosity of the tortuous gap 560 refers to the actual flow path length of the tortuous gap 560 divided by the linear distance between the mouth of the tortuous gap 560 and the end of the tortuous gap 560 (e.g. where the tortuous gap 560 meets the first cassette seal 164). In other examples, the cross-sectional shape of the mutually interlocking protrusion 564 and the recess 562 may be triangular, or polygonal, or rounded; however, the cross-sectional dimensions of the recess 562 may be larger than those of the protrusion 564 so that the tortuous gap 560 therebetween may be maintained. In some examples, the cross-sectional shape of the protrusion 564 may be different from the cross-sectional shape of the recess 562 so that flow material may encounter converging and/or diverging walls as it flows interiorly along the tortuous gap 560.

In the example of FIG. 5, the mouth of the labyrinth seal 162 includes lip 541 of the output cover 140 and lip 521 of the stationary housing 120 that are positioned at an external surface of the gear box 100. In particular, the lip 541 and lip 521 are exposed to the external atmosphere surrounding the gear box 100 at the mouth of the labyrinth seal 162.

A thickness of the tortuous gap 560 may be configured to aid in mitigating ingress of flow materials into the gear box 100, while allowing for free rotation of the output cover 140 relative to the stationary housing 120. As shown in FIG. 5, for the case of a rectangular cross-section protrusion 564 and recess 562, the tortuous gap 560 may include one or more of a thickness in the r-direction, and a thickness in the z-direction. In one example, upon assembly of the gear box 100, including assembly of the multilayer sealing arrangement, a thickness of the gap 560 may range from 0.5 mm to 1.3 mm. These thicknesses may be set by controlling manufacturing tolerances of the protrusion 564 and the recess 562. For example, the thickness of the tortuous gap 560 in the r-direction may be set by setting a length 540 of the protrusion 564 in the r-direction less than the length 530 of the recess in the r-direction; assuming the protrusion 564 is centered within the recess, the thickness of the tortuous gap 560 in the r-direction is then one half of the difference between the length 540 and the length 530. In another example, a thickness of the gap in the z-direction 550 may correspond to an amount of z-direction overlap 510 between the protrusion 564 and the recess 562; here, the gap thickness 550 is equivalent to the length of the recess 562 in the z-direction minus the amount of overlap 510. Furthermore, a thickness 520 of the mouth of the tortuous gap 560 may be determined by a difference of the length of the protrusion 564 in the z-direction minus the amount of overlap 510. In general, reducing the gap thicknesses described above aids in mitigating ingress of flow materials into the gear box 100, however free rotation of the output cover 140 relative to the stationary housing 120 may be reduced, especially for more complex labyrinth seals, including multiple pairs of interlocking elements and/or including more complex interlocking element geometries. In this way, each of the recess 562 of the output cover 140 and the protrusion 564 of the stationary housing 120 are arranged to be mutually interlocking whereby the protrusion 564 is fitted together and mated with the recess 562 except for the tortuous gap 660 formed therebetween.

Figure 6:
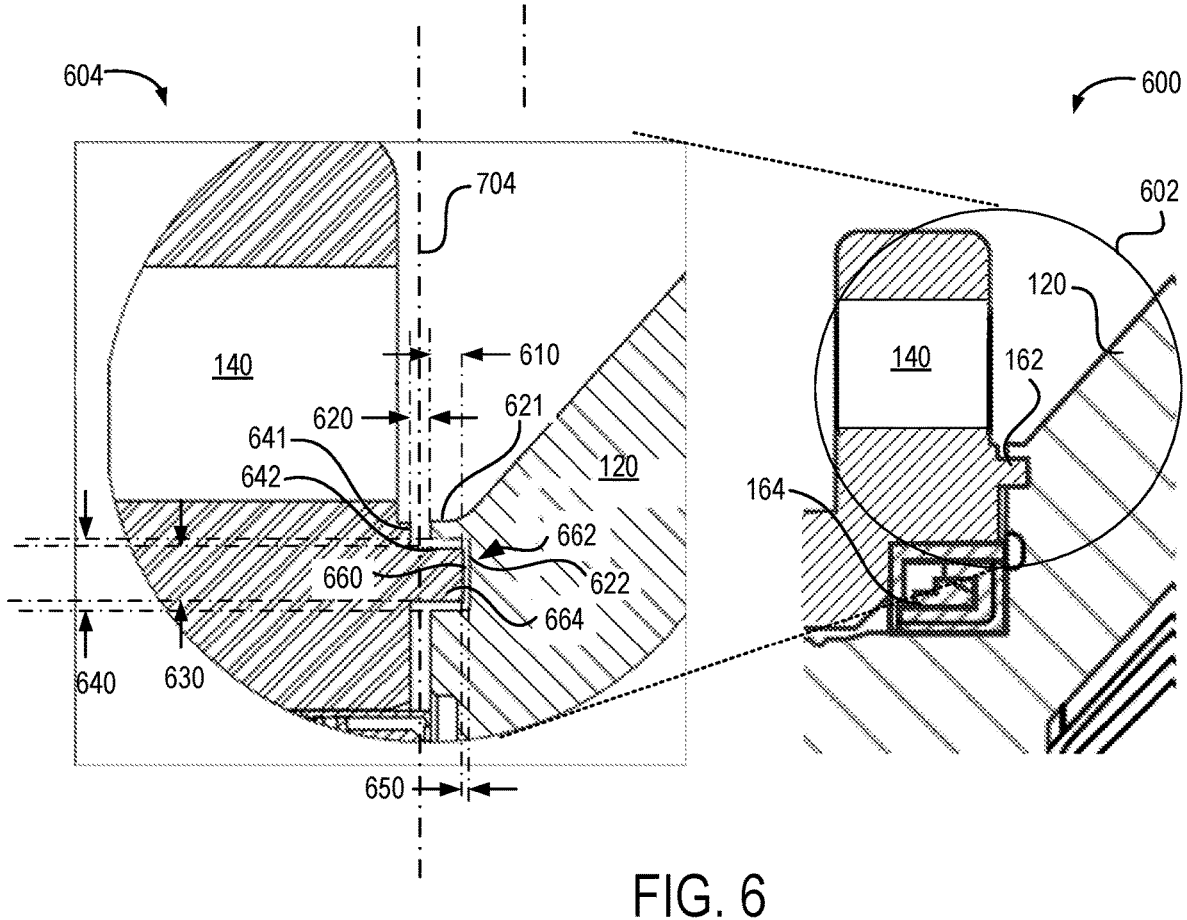
FIG. 6 shows a partial cross-sectional view of the drive gear box of FIG. 1, including a second embodiment of a labyrinth seal of the multilayer sealing arrangement.

Turning now to FIG. 6, it illustrates a schematic 600 of a partial cross-sectional view of the drive gear box of FIG. 1, including a second embodiment of a labyrinth seal 162 of the multilayer sealing arrangement, and a schematic 604 of an enlarged circular portion 602 of the cross-sectional view of schematic 600. As depicted in schematic 604, the second embodiment of the labyrinth seal 162 is positioned at a convergence of the external surfaces of the output cover 140 and the stationary housing 120 at axis 704. Furthermore, the second embodiment of the labyrinth seal includes stationary housing 120 with a recess 662 and output cover 140 with a protrusion 664. In particular, the recess 662 and the protrusion 664 form mutually interlocking elements of the respective stationary housing 120 and the output cover 140. Specifically, the protrusion 664 of output cover 140 extends across the axis 704 and into the recess 662. In this way, the protrusion 664 overlaps with the recess 662 across the axis 704, where the internal surfaces 642 and 622 of the output cover 140 and the stationary housing 120, respectively, approach but do not make face-sharing contact with each other, thereby increasing a tortuosity and elongating a first gap 760 therebetween to form a tortuous gap 660. As such, the tortuous gap 660 formed between the internal surfaces 642 and 622 is more tortuous and elongated relative to first gap 760 and may cross the axis 704 in multiple and opposing directions. Accordingly, any flowing material penetrating in to the labyrinth seal 162 is directed along the tortuous gap 660, thereby crossing the axis 704 (also referred herein to as the interlocking axis) in multiple an opposing directions as it flows in an interior direction. In the example of FIG. 6, flowing material enters the gear box 100 at the mouth of tortuous gap 660 and flows across the axis 704 in the negative z-direction before flowing across the axis 704 in the positive z-direction as it moves interiorly through the tortuous gap 660. As shown in FIG. 7, in the absence of the labyrinth seal 162, the surfaces 742 and 722 forming the first gap 760 do not cross over or extend across the axis 704.

In the example of FIG. 6, the cross-sectional shape of the protrusion 664 is of a square or rectangular shape, and the cross-sectional shape of the recess 662 includes a square or rectangular shape. The cross-sectional shape of recess 662 is slightly larger than the cross-sectional shape of the protrusion 664, which facilitates formation of the tortuous gap 660 between the perimeters of the protrusion 664 and the recess 662. In particular, owing to the protrusion 664 and recess 662, flowing material entering the gear box 100 at the tortuous gap 660 must flow and negotiate four 90-degree bends in the tortuous gap 660 in order to move interiorly past them. Furthermore, the four 90-degree bends in the tortuous gap 660 include two 90-degree bends to the right and two 90-degree bends to the left (right and left relative to moving along the tortuous gap 660 interiorly). In the example of FIG. 6, the labyrinth seal 162 includes at least one pair of mutually interlocking elements; in other words, in other examples, the labyrinth seal 162 may include one or more pairs of interlocking elements. When the labyrinth seal 162 includes additional pairs of mutually interlocking elements a tortuosity and path length of the fluid path 170 may be further increased, thereby further mitigating ingress of flow materials into the gear box 100; however, including additional pairs of mutually interlocking elements may also increase a manufacturing complexity and repair frequency of the gear box 100, and may reduce free rotation of the output cover 140 due to increased friction with the grease in the tortuous gap 660.

The square or rectangular cross-sectional shape of the protrusion 664 and the recess 662 may aid in increasing the tortuosity and path length of the tortuous gap 660 while maintaining capability of the output cover 140 about the stationary housing 120. Here, the tortuosity of the tortuous gap 660 refers to the actual flow path length of the tortuous gap 660 divided by the linear distance between the mouth of the tortuous gap 660 and the end of the tortuous gap 660 (e.g. where the tortuous gap 660 meets the first cassette seal 164). In other examples, the cross-sectional shape of the mutually interlocking protrusion 664 and the recess 662 may be triangular, or polygonal, or rounded; however, the cross-sectional dimensions of the recess 662 may be larger than those of the protrusion 664 so that the tortuous gap 660 therebetween may be maintained. In some examples, the cross-sectional shape of the protrusion 664 may be different from the cross-sectional shape of the recess 662 so that flow material may encounter converging and/or diverging walls as it flows interiorly along the tortuous gap 660.

In the example of FIG. 6, the mouth of the labyrinth seal 162 includes lip 641 of the output cover 140 and lip 621 of the stationary housing 120 that are positioned at an external surface of the gear box 100. In particular, the lip 641 and lip 621 are exposed to the external atmosphere surrounding the gear box 100 at the mouth of the labyrinth seal 162. Furthermore, the lips 641 and 621 are aligned flush with respect to the radial coordinate, r, which may encourage convection and flushing of the flow material external to the gear box 100 past the mouth of the labyrinth seal 162, instead of accumulating near the mouth. In other examples, the lips 641 and 621 may be aligned to be offset with respect to the radial direction. Offsetting the lips may create a dead flow zone where flow material may accumulate external to the labyrinth seal 162 but adjacent to the mouth when the vehicle system is in motion. Accumulated flow material may then be entrained into the gear box 100 upon further vehicle motion. As such, aligning the lips 641 and 621 to be flush with respect to the radial direction may better aid in mitigating ingress of fluids and solids into the gear box 100.

A thickness of the tortuous gap 660 may be configured to aid in mitigating ingress of flow materials into the gear box 100, while allowing for free rotation of the output cover 140 relative to the stationary housing 120. As shown in FIG. 6, for the case of a rectangular cross-section protrusion 664 and recess 662, the tortuous gap 660 may include one or more of a thickness in the r-direction, and a thickness in the z-direction. These thicknesses may be set by controlling manufacturing tolerances of the protrusion 664 and the recess 662. For example, the thickness of the tortuous gap 660 in the r-direction may be set by setting a length 640 of the protrusion 664 in the r-direction less than the length 630 of the recess in the r-direction; assuming the protrusion 664 is centered within the recess, the thickness of the tortuous gap 660 in the r-direction is then one half of the difference between the length 640 and the length 630. In another example, a thickness of the gap in the z-direction 650 may correspond to an amount of z-direction overlap 610 between the protrusion 664 and the recess 662; here, the gap thickness 650 is equivalent to the length of the recess 662 in the z-direction minus the amount of overlap 610. Furthermore, a thickness 620 of the mouth of the tortuous gap 660 may be determined by a difference of the length of the protrusion 664 in the z-direction minus the amount of overlap 610. In general, reducing the gap thicknesses described above aids in mitigating ingress of flow materials into the gear box 100, however free rotation of the output cover 140 relative to the stationary housing 120 may be reduced, especially for more complex labyrinth seals, including multiple pairs of interlocking elements and/or including more complex interlocking element geometries. In this way, the protrusion 664 and the recess 662 are arranged to be mutually interlocking whereby the protrusion 664 is fitted together and mated with the recess 662 except for the tortuous gap 660 formed therebetween.

Turning now to FIG. 8, it shows an example of a conventional mechanical face seal 800. Mechanical face seal 168, incorporated into the multilayer sealing arrangement, may include a seal such as mechanical face seal 800. Mechanical face seals are typically heavy duty seals designed for preventing ingress of harsh and abrasive material in rotating equipment while withstanding severe wear. Mechanical face seal 800 includes a metal ring 804 and a metal ring 824, that are identical and mounted in housing 802 and housing 820, respectively. In the example of FIG. 8, the metal seal rings 804 and 824 are mounted so that their lapped seal faces 806 and 826, respectively, are in face-sharing contact near their outside borders 807 and 834, and are aligned at an axis 814 therebetween. Furthermore, the seat surfaces 816 and 836 may include toric ring seat surfaces. The metal seal rings 804 and 824 are centered within their housings 802 and 820 by an elastomer element such as an elastomeric O-ring or other elastomeric seal 803 and 823. The elastomeric seals 803 and 823 may be positioned in the mechanical face seal 800 by seating them between housing seat surfaces 812 and 822, and the metal rings 804 and 824. During operation of the gear box 100 in the vehicle system, one half of the mechanical face seal may remain static in the housing, while the other half rotates with its counter face (e.g., rotates with the output cover 140). In this way, the mechanical face seal 800 mitigates penetration of material through the lapped seal faces 806 and 826 along the axis 814; in addition, the seating (and scaling) of the elastomeric seals 803 and 823 at the housing seat surfaces 812 and 822 as well as at the metal rings 804 and 824, respectively, mitigate penetration of material through the mechanical face seal 800. Accordingly, in the multilayer sealing arrangement, positioning the mechanical face seal 800 within a cavity of the fluid path 170 aids in mitigating penetration of flowing materials into the gear box 100.

Turning now to FIG. 9, it shows schematic of a radial cross-section of an example cassette seal 900. First cassette seal 164 and second cassette seal 166, incorporated into the multilayer sealing arrangement, may include a seal such as the cassette seal 900. Cassette seal 900 includes a plurality of cassette sleeves 950 and 956, and one or more static seals and one or more dynamic seals that work in combination to mitigate penetration of flowing material from an upstream side 990 to a downstream side 992. In particular, the cassette sleeves 950 and 956 provide the structure and shape of the cassette seal 900. Specifically, cassette sleeve 956 may be arranged relative to cassette sleeve 950 to form a volume 960 therebetween, while snugly seating and fitting against external sealing surfaces external thereto (e.g., above, below, and at both an upstream side 990 and a downstream side 992). The cassette sleeves 950 and 956 may be formed from metal and may be bent and convoluted in cross-section (as depicted in FIG. 9) so as to form a compressible elastic shape while maintaining the volume 960 therebetween.

The static seals may include a housing bore static seal 910 and a shaft static seal 914 formed and having direct face-sharing contact with the external surfaces of the cassette sleeves 956 and 950, respectively. In this way, the housing bore static seal 910 and the shaft static seal 914 may aid in sealing between the cassette seal 900 and the external surfaces seated against the cassette seal 900. In one example, the housing bore static seal 910 and the shaft static seal 914 may be bonded to the external surfaces of the cassette sleeves 956 and 950, respectively so as to maintain a shape and an integrity of the cassette seal 900, including a shape and integrity of the volume 960. The dynamic seals may include a compressible labyrinthine seal 920 as well as a compressible sealing lip 902 and a slip ring 906, which have been bonded together. The compressible labyrinthine seal 920 and the compressible sealing lip 902 may be formed from a rubberized elastomeric material that is flexible and elastic. In this way, during dynamic operation, the cassette sleeve 950, shaft static seal 914, and the compressible labyrinthine seal 920 may rotate relative to the cassette sleeve 956, housing bore static seal 910, and the compressible scaling lip. Accordingly, the cassette seal 900 may flex and adapt its volume and cross-sectional shape to maintain a seal for mitigating flowing materials from penetrating from the upstream side 990 through the cassette seal 900 to the downstream side 992. The metal seal ring 906 may aid in maintaining a position of the sealing lip 902 against the sleeve 950, and in maintaining a position of the sleeve 950 and shaft static seal 914 against an external seal seating surface. In some examples, the sealing lip 902 and the slip ring 906 may be lubricated so as to mitigate friction and wear therebetween, and to facilitate flexing and adapting of the sealing lip 902 and the slip ring 906 to maintain seating of the cassette seal 900 relative to external seating surfaces.

In this manner, a gear box includes a stationary housing and one or more rotating members, a multilayer sealing arrangement formed between and sealing a fluid path between the one or more rotating members and the stationary housing, the multilayer sealing arrangement including a labyrinth seal, a first cassette seal, and a mechanical face seal, wherein the one or more rotating members includes a rotating hub, and the labyrinth seal is formed between the rotating hub and the stationary housing, whereby the rotating hub overlaps with the stationary housing. In a first example, the gear box further includes, wherein the labyrinth seal is positioned directly adjacent to an external surface of the gear box and external to the first cassette seal. In a second example, optionally including the first example, the gear box further includes, wherein the first cassette seal is positioned internally within the gear box between the mechanical face seal and the labyrinth seal in the multilayer sealing arrangement. In a third example, optionally including one or more of the first and second examples, the gear box further includes, wherein the one or more rotating members includes a driveshaft, and wherein the mechanical face seal is positioned internally within the gear box between the driveshaft and the first cassette seal. In a fourth example, optionally including one or more of the first through third examples, the gear box further includes, a second cassette seal, the second cassette seal positioned internally within the gear box between the mechanical face seal and the first cassette seal in the multilayer sealing arrangement. In a fifth example, optionally including one or more of the first through fourth examples, the gear box further includes, wherein the multilayer sealing arrangement further comprises grease filling the fluid path between the mechanical face seal and the first cassette seal. In a sixth example, optionally including one or more of the first through fifth examples, the gear box further includes, wherein the multilayer sealing arrangement further comprises grease filling the fluid path between the labyrinth seal and the first cassette seal.

In this manner, a gear box for a vehicle system includes, a stationary housing, a driveshaft, a rotating hub, and a multilayer seal formed between and sealing a fluid path between the driveshaft, the rotating hub and the stationary housing, the multilayer seal including, a labyrinth seal formed between the rotating hub and the stationary housing. In a first example, the gear box for the vehicle system further includes, wherein the rotating hub and the stationary housing form at least one pair of mutually interlocking elements, wherein each of the at least one pair of mutually interlocking elements elongate and increase a tortuosity of the fluid path between the rotating hub and the stationary housing. In a second example, optionally including the first example, the gear box for the vehicle system further includes, wherein the at least one pair of mutually interlocking elements include a recess in the rotating hub interlocked with a protrusion in the stationary housing. In a third example, optionally including one or more of the first and second examples, the gear box for the vehicle system further includes, wherein the at least one pair of mutually interlocking elements including a protrusion in the rotating hub interlocked with a recess in the stationary housing. In a fourth example, optionally including one or more of the first through third examples, the gear box for the vehicle system further includes, wherein each of the at least one pair of mutually interlocking elements elongate and increase the tortuosity of the fluid path in a direction of an interlocking axis, the interlocking axis perpendicular to a longitudinal axis of the driveshaft. In a fifth example, optionally including one or more of the first through fourth examples, the gear box for the vehicle system further includes, wherein each of the at least one pair of mutually interlocking elements include a tortuous gap between the at least one pair of mutually interlocking elements, the tortuous gap including grease filling the fluid path between the at least one pair of interlocking elements. In a sixth example, optionally including one or more of the first through fifth examples, the gear box for the vehicle system further includes, wherein the tortuous gap allows the rotating hub to rotate relative to the stationary housing freely except for the grease in the fluid path. In a seventh example, optionally including one or more of the first through sixth examples, the gear box for the vehicle system further includes, wherein rotation of the driveshaft generates traction for propelling the vehicle system.

Turning now to FIG. 10, it illustrates a flow chart for a method 1000 of assembling a gear box 100, including a multilayer sealing arrangement. Method 1000 begins at 1002 where a multilayer seal is formed in the fluid path of the gear box 100, which may include one or more steps 1010-1064. At step 1010, method 1000 includes positioning a labyrinth seal 162 in the fluid path of the gear box 100. In one example, the labyrinth seal 162 may be incorporated into a first gap 760 between a rotating output cover 140 and the stationary housing 120. As described herein with reference to FIGS. 1-6, the labyrinth seal 162 may include mutually interlocking elements of the output cover 140 and the stationary housing 120 that elongate and increase a tortuosity of the fluid path therethrough. Positioning the labyrinth seal 162 may further include positioning the labyrinth seal 162 at a mouth of the gap 760, whereby the labyrinth seal 162 extends from the mouth of the first gap 760 internally into the gear box 100. In some examples the labyrinth seal 162 may extend to a first cavity 755 inside the gear box 100.

Next, at step 1020, method 1000 may include positioning a first cassette seal 164 in the fluid path of the gear box 100. In one example, the first cassette seal 164 may be positioned within a first cavity 755 of the fluid path. As such, the first cassette seal 164 is positioned more internally relative to the labyrinth seal 162. As an example the first cassette seal 164 may include a device such as cassette seal 900. Furthermore, the first cassette seal 164 may be a removable cassette seal whereby the first cassette seal 164 may be removed from the multilayer sealing arrangement without modifying the stationary housing 120, output cover 140, output driveshaft 110, other seals of the multilayer sealing arrangement, or other mating part of the gear box 100.

Next, at step 1030, method 1000 may include positioning a second cassette seal 166 in the fluid path of the gear box 100. In one example, the second cassette seal 166 may be positioned within a second cavity 750 of the fluid path. As such, the second cassette seal 166 is positioned more internally relative to the first cassette seal 164. As an example the second cassette seal 166 may include a device such as cassette seal 900. Positioning the second cassette seal 166 may include arranging positioning elements such as a cylindrical cover 262 and an O-ring 264, which aid in holding the position of the second cassette seal 166 in place relative to the output cover 140 and within the fluid path, as described above with reference to FIG. 2. As such, the cylindrical cover 262 and the O-ring 264 are separate elements from the second cassette seal 166, and are assembled separately along with the second cassette seal 166 when forming the multilayer sealing arrangement. Furthermore, the second cassette seal 166 may be a removable cassette seal whereby the second cassette seal 166 may be removed from the multilayer sealing arrangement (including removing positioning elements such as the cylindrical cover 262 and the O-ring 264) without modifying the stationary housing 120, output cover 140, output driveshaft 110, other seals of the multilayer sealing arrangement, or other mating part of the gear box 100.

Next at step 1040, method 1000 may include positioning a mechanical face seal 168 in the fluid path of the gear box 100. In one example, the mechanical face seal 168 may be positioned within the second cavity 750 of the fluid path, adjacent to the output driveshaft 110. In this way, the mechanical face seal 168 may be positioned more internally relative to the second cassette seal 166. Lubricating oil between the output driveshaft 110 and the mechanical face seal 168 may aid in cooling and mitigating friction therebetween. As an example, the mechanical face seal 168 may include a device such as the mechanical face seal 800. Furthermore, the mechanical face seal may be a removable mechanical face seal whereby the mechanical face seal 168 may be removed from the multilayer sealing arrangement without modifying the stationary housing 120, output cover 140, output driveshaft 110, other seals of the multilayer sealing arrangement, or other mating part of the gear box 100.

Next, at step 1050, method 1000 may include filling the interseal cavities in the fluid path with grease. Filling the interseal cavities may include filling one or more of the tortuous gap 560 or tortuous gap 660 of the labyrinth seal 162, second gap 762 (positioned between the first cassette seal 164 and the cavity 150), cavity 150, cavity 151, and cavity 153.

Next at step 1060, a first condition being satisfied may be evaluated. The first condition being satisfied may include when a vehicle system is operating in a less severe or lighter duty environment, and may further include when a reduced gear box drag for increased gear box efficiency may be desirable. If the first condition is not satisfied, method 1000 ends. For the case where the first condition is satisfied, method 1000 continues to step 1064 where one or more of the second cassette seal 166 and the mechanical face seal 168 are removed from the multilayer sealing arrangement. As described above, the second cassette seal 166 and the mechanical face seal 168 are both removable seals, whereby removing one or more of the second cassette seal 166 and the mechanical face seal 168 is performed without modifying the output cover 140, stationary housing 120, output driveshaft 110, or other seals of the multilayer sealing arrangement. The second embodiment 300 of the multilayer sealing arrangement corresponds to the case where only the second cassette seal 166 is removed. The third embodiment 400 of the multilayer scaling arrangement corresponds to the case where both the second cassette seal 166 and the mechanical face seal 168 are removed. As described with reference to FIGS. 3 and 4, removing the second cassette seal 166 and/or removing the mechanical face seal 168 may include removing additional adjacent and or mating components.

In this manner, a method of assembling a gear box includes, forming a multilayer seal in a fluid path between one or more rotating members and a stationary housing of the gear box, including, positioning a labyrinth seal in the fluid path between a rotating hub of the gear box and stationary housing, wherein the rotating hub overlaps with the stationary housing, and wherein the one or more rotating members includes the rotating hub, positioning a first cassette seal in the fluid path, and positioning a mechanical face seal in the fluid path. In a first example, the method further includes, positioning a second cassette seal in the fluid path between the first cassette seal and the mechanical face seal. In a second example, optionally including the first example, the method further includes, wherein forming the multilayer seal includes filling the fluid path between the mechanical face seal and the labyrinth seal with grease. In a third example, optionally including one or more of the first and second examples, the method further includes, wherein positioning the first cassette seal in the fluid path includes positioning the first cassette seal in the fluid path between the labyrinth seal and the mechanical face seal. In a fourth example, optionally including one or more of the first through third examples, the method further includes, wherein positioning the mechanical face seal in the fluid path includes positioning the mechanical face seal in the fluid path between a driveshaft and the first cassette seal.

FIGS. 1-7 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

The technical effect of the gear box including the multilayer sealing arrangement includes substantially reducing ingress of foreign materials such as fluids and solids into the gear box, thereby prolonging the life of the gear box and increasing operational duration of the vehicle system before the gear box needs to be repaired or serviced. Furthermore, by positioning the mechanical face seal internally within the gear box, a size of the mechanical face seal can be reduced relative to the sealing arrangement for a conventional drive gear box that consists of a single mechanical face seal is positioned at an external surface of the gear box. As such, a maximum rotational speed of the gear box drive can be increased while mitigating wear and degradation due to friction at the mechanical face seal. Further still, the multilayer sealing arrangement, provides inherent redundancy to sealing of the drive gear box, and can increase adaptability of the drive gear box to various operational environments. In particular, when the gear box is subject to less severe operational environments, one or more of the mechanical face seal and a cassette seal may be removed without altering the configuration of the remaining gear box elements. Removing one or more of the mechanical face seal and a cassette seal can advantageously reduce a drag force on rotational elements of the gear box, thereby increasing an efficiency and useful life of the gear box.

Note that the example routines included herein can be used with various engine and/or vehicle system configurations. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of the method steps is not necessarily required to achieve the features and advantages of the example embodiments described herein, but is provided for ease of illustration and description. One or more of the illustrated actions, operations and/or functions may be repeatedly performed depending on the particular strategy being used.

As used herein, the term "approximately" is construed to mean plus or minus five percent of the range unless otherwise specified.

It will be appreciated that the configurations disclosed herein are exemplary in nature, and that these specific examples are not to be considered in a limiting sense, because numerous variations are possible. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A gear box for a vehicle system, including:
a stationary housing, a driveshaft, a rotating hub, and
a multilayer seal formed between and sealing a fluid path between the driveshaft, the rotating hub and the stationary housing, the multilayer seal including,
 a labyrinth seal formed between the rotating hub and the stationary housing,
 wherein the labyrinth seal is positioned directly adjacent to an external surface of the gear box and external to a first cassette seal, and
 wherein the first cassette seal is positioned internally within the gear box between a mechanical face seal and the labyrinth seal in the multilayer seal.

2. The gear box of claim 1, wherein the rotating hub and the stationary housing form at least one pair of mutually interlocking elements, wherein each of the at least one pair of mutually interlocking elements elongate and increase a tortuosity of the fluid path between the rotating hub and the stationary housing.

3. The gear box of claim 2, wherein the at least one pair of mutually interlocking elements include a recess in the rotating hub interlocked with a protrusion in the stationary housing.

4. The gear box of claim 2, wherein the at least one pair of mutually interlocking elements including a protrusion in the rotating hub interlocked with a recess in the stationary housing.

5. The gear box of claim 2, wherein each of the at least one pair of mutually interlocking elements elongate and increase the tortuosity of the fluid path in a direction of an interlocking axis, the interlocking axis perpendicular to a longitudinal axis of the driveshaft.

6. The gear box of claim 2, wherein each of the at least one pair of mutually interlocking elements include a tortuous gap between the at least one pair of mutually interlocking elements, the tortuous gap including grease filling the fluid path between the at least one pair of interlocking elements.

7. The gear box of claim 6, wherein the tortuous gap allows the rotating hub to rotate relative to the stationary housing freely except for the grease in the fluid path.

8. The gear box of claim 7, wherein rotation of the driveshaft generates traction for propelling the vehicle system.

9. A gear box, including:
a stationary housing and one or more rotating members,
a multilayer sealing arrangement formed between and sealing a fluid path between the one or more rotating members and the stationary housing, the multilayer sealing arrangement including a labyrinth seal, a first cassette seal, and a mechanical face seal, wherein
the one or more rotating members includes a rotating hub, and
the labyrinth seal is formed between the rotating hub and the stationary housing, whereby the rotating hub overlaps with the stationary housing,
wherein the labyrinth seal is positioned directly adjacent to an external surface of the gear box and external to the first cassette seal, and
wherein the first cassette seal is positioned internally within the gear box between the mechanical face seal and the labyrinth seal in the multilayer sealing arrangement.

10. The gear box of claim 1, wherein the one or more rotating members includes a driveshaft, and wherein the mechanical face seal is positioned internally within the gear box between the driveshaft and the first cassette seal.

11. The gear box of claim 10, further comprising a second cassette seal, the second cassette seal positioned internally within the gear box between the mechanical face seal and the first cassette seal in the multilayer sealing arrangement.

12. The gear box of claim 10, wherein the multilayer sealing arrangement further comprises grease filling the fluid path between the mechanical face seal and the first cassette seal.

13. The gear box of claim 10, wherein the multilayer sealing arrangement further comprises grease filling the fluid path between the labyrinth seal and the first cassette seal.

14. A method of assembling a gear box including:
forming a multilayer seal in a fluid path between one or more rotating members and a stationary housing of the gear box, including,
positioning a labyrinth seal in the fluid path between a rotating hub of the gear box and the stationary housing, wherein the rotating hub overlaps with the stationary housing, and wherein the one or more rotating members includes the rotating hub,
positioning a first cassette seal in the fluid path,
positioning a mechanical face seal in the fluid path, and
positioning a second cassette seal in the fluid path between the first cassette seal and the mechanical face seal.

15. The method of claim 14, wherein forming the multilayer seal includes filling the fluid path between the mechanical face seal and the labyrinth seal with grease.

16. The method of claim 14, wherein positioning the first cassette seal in the fluid path includes positioning the first cassette seal in the fluid path between the labyrinth seal and the mechanical face seal.

17. The method of claim 16, wherein the one or more rotating members includes a driveshaft, and wherein positioning the mechanical face seal in the fluid path includes positioning the mechanical face seal in the fluid path between the driveshaft and the first cassette seal.

* * * * *